US011930031B2

(12) United States Patent
Smith et al.

(10) Patent No.: US 11,930,031 B2
(45) Date of Patent: Mar. 12, 2024

(54) DISTRIBUTED NETWORK BASED VULNERABILITY SCANNING VIA ENDPOINT AGENT DEPLOYMENT

(71) Applicant: Tenable, Inc., Columbia, MD (US)

(72) Inventors: Benjamin Smith, Jersey City, NJ (US); Manoj Srivastava, Ellicott City, MD (US)

(73) Assignee: TENABLE, INC., Columbia, MD (US)

(*) Notice: Subject to any disclaimer, the term of this patent is extended or adjusted under 35 U.S.C. 154(b) by 517 days.

(21) Appl. No.: 16/909,741

(22) Filed: Jun. 23, 2020

(65) Prior Publication Data
US 2021/0400074 A1     Dec. 23, 2021

(51) Int. Cl.
*H04L 9/40* (2022.01)
*G06F 21/57* (2013.01)
*H04L 29/06* (2006.01)
*H04L 45/02* (2022.01)

(52) U.S. Cl.
CPC ........ *H04L 63/1433* (2013.01); *G06F 21/577* (2013.01); *H04L 45/02* (2013.01); *H04L 63/102* (2013.01); *H04L 63/1416* (2013.01); *H04L 63/1425* (2013.01); *H04L 63/20* (2013.01)

(58) Field of Classification Search
CPC .............. H04L 63/1433; H04L 63/102; H04L 63/1416; H04L 63/1425; H04L 63/20; G06F 21/577
See application file for complete search history.

(56) References Cited

U.S. PATENT DOCUMENTS

| 9,319,425 | B2 | 4/2016 | Giokas | |
|---|---|---|---|---|
| 9,516,064 | B2 | 12/2016 | Lietz et al. | |
| 10,440,049 | B2 | 10/2019 | Boutnaru et al. | |
| 2005/0005169 | A1* | 1/2005 | Kelekar | G06F 9/542 726/4 |
| 2011/0231935 | A1* | 9/2011 | Gula | H04L 43/028 709/224 |
| 2014/0007241 | A1* | 1/2014 | Gula | H04L 63/1433 726/25 |

FOREIGN PATENT DOCUMENTS

WO     2019127890 A1     7/2019

* cited by examiner

*Primary Examiner* — Edward Zee
(74) *Attorney, Agent, or Firm* — Muncy, Geissler, Olds & Lowe, P.C.; Daniel Podhajny (57) ABSTRACT

Techniques, methods and/or apparatuses are disclosed that enable passive scanning of a network. Through the disclosed techniques, methods and/or apparatuses, endpoint passive scanners are deployed at endpoints of the network to provide more comprehensive view of assets and asset information of the network. Also, this can enable better correlation of network data to location, and also enable improved vulnerability analysis for endpoint products.

28 Claims, 8 Drawing Sheets

DISTRIBUTED NETWORK BASED VULNERABILITY SCANNING VIA ENDPOINT AGENT DEPLOYMENT

TECHNICAL FIELD

The various aspects and embodiments described herein generally relate to vulnerability scanning, and more particularly to distributed network based vulnerability scanning via endpoint agent deployment.

BACKGROUND

With increasing threats and a constantly changing information technology (IT) landscape, security teams today can barely keep up with the pace of identifying vulnerabilities and threats and, more importantly, fixing them. Furthermore, as more and more organizations embrace virtualization, the cloud, mobile, and collaboration and communication among software development and IT operations (sometimes called "DevOps"), the fundamental concept of an asset changes and radically impacts how and when organizations and security teams need to assess vulnerabilities.

Figure 1:
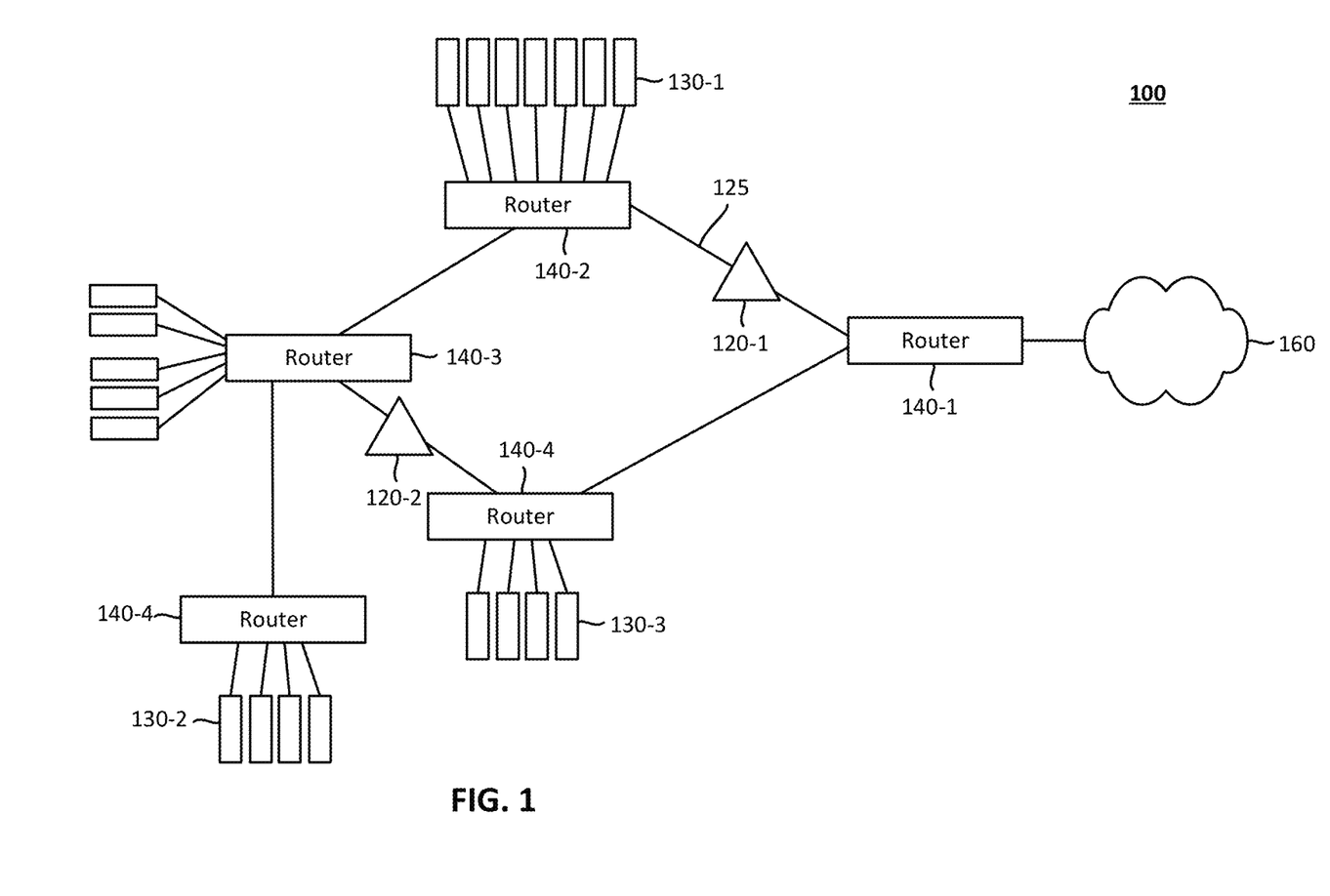
FIG. 1 illustrates an example of a conventional network for passive scanning.

A network can be passively monitored to discover assets and identify vulnerabilities. FIG. 1 illustrates an example conventional network 100 for passive scanning. The network 100 includes passive scanners 120-1, 120-2 (collectively or individually 120), endpoint devices 130-1, 130-2, 130-3 (collectively or individually 130), and routers 140-1 . . . 140-4 (collectively or individually 140). Network 100 may access Internet 160 through router 140-1. Passive scanner 120 passively listens or "sniffs" network packets in network traffic. For example, FIG. 1 illustrates passive scanner 120-1 sniffing network traffic 125 (e.g., packet stream comprising plurality of packets) between routers 140-1, 140-2. From the sniffed packets, passive scanner 120 can reconstruct network sessions to create a network model or topology of each network endpoint device 130 that is active together with its active services. Passive scanner 120 can also apply "signatures" to the traffic in such a way that the presence of vulnerabilities can be determined. This network model of active endpoint devices, services and vulnerabilities can be produced by passive scanner 120.

One significant limitation of passive scanner 120 is its dependency on network traffic to detect the existence of a device or make a conclusion about vulnerabilities. That is, the visibility of network 100 to passive scanner 120 is limited. For example, passive scanner 120-1 can only sniff the network traffic that flows between routers 140-1, 140-2. Passive scanner 120-1 would not have visibility to network traffic that takes other paths. For example, communication between endpoint devices 130-1, 130-2 may flow through routers 140-2, 140-3, 140-4, and passive scanner 120-1 would not be able to sniff those packets.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

An embodiment is directed to a method for passively scanning a network. The method may comprise sniffing, by an endpoint passive scanner deployed on an endpoint device, network traffic traveling to and/or from the endpoint device. The network traffic may comprise a plurality of packets. The method may also comprise detecting, by the endpoint passive scanner, information that facilitates discovery of one or more assets of the network and/or identification of one or more vulnerabilities in one or more network entities and/or one or more services based on the sniffed network traffic.

Another embodiment is also directed to a method for passively scanning a network. The method may comprise obtaining information that is detected based on network traffic traveling to and/or from an endpoint device that is sniffed by an endpoint passive scanner deployed on the network endpoint device. The network traffic may comprise a plurality of packets. The method may also comprise discovering one or more assets of the network and/or identifying one or more vulnerabilities in one or more network entities and/or one or more services based on the obtained information.

Another embodiment is directed to an endpoint device configured to passively scan a network. The network endpoint device may comprise a memory and at least one processor coupled to the memory. When an endpoint passive scanner is deployed on the endpoint device, the at least one processor and the memory may be configured to sniff network traffic traveling to and/or from the network endpoint device. The network traffic may comprise a plurality of packets. The at least one processor and the memory may also be configured to detect information that facilitates discovery of one or more assets of the network and/or identification of one or more vulnerabilities in one or more network entities and/or one or more services based on the sniffed network traffic.

Another embodiment is directed to a system configured to passively scan a network. The system may comprise an endpoint passive scanner deployed on an endpoint device. The endpoint passive scanner may be configured to obtain information that is detected based on network traffic traveling to and/or from the network endpoint device that is sniffed by the endpoint passive scanner. The network traffic may comprise a plurality of packets. The system may also comprise an asset/vulnerability agent deployed on a network entity. The asset/vulnerability agent may be configured to discover one or more assets of the network and/or identify one or more vulnerabilities in one or more network entities and/or one or more services based on the obtained information.

Another embodiment is directed to an endpoint device configured to passively scan a network. The network endpoint device may comprise an endpoint passive scanner deployed on the endpoint device. The endpoint passive scanner may comprise means for sniffing network traffic traveling to and/or from the network endpoint device. The network traffic may comprise a plurality of packets. The endpoint passive scanner may also comprise means for detecting information that facilitates discovery of one or more assets of the network and/or identification of one or more vulnerabilities in one or more network entities and/or one or more services based on the sniffed network traffic.

Another embodiment is directed to a system configured to passively scan a network. The system may comprise means for obtaining information that is detected based on network traffic traveling to and/or from an endpoint device that is sniffed by an endpoint passive scanner deployed on the network endpoint device. The network traffic may comprise a plurality of packets. The system may also comprise means for discovering one or more assets of the network and/or identifying one or more vulnerabilities in one or more network entities and/or one or more services based on the obtained information.

Another embodiment is directed to a non-transitory computer-readable medium storing computer-executable instructions for an endpoint device configured to passively scan a network. The computer-executable instructions may comprise computer-executable instructions for an endpoint passive scanner deployed in the endpoint device. The computer-executable instructions for the endpoint passive scanner may comprise one or more instructions causing the network endpoint device to sniff network traffic traveling to and/or from the network endpoint device. The network traffic may comprise a plurality of packets. The computer-executable instructions for the endpoint passive scanner may also comprise one or more instructions causing the network endpoint device to detect information that facilitates discovery of one or more assets of the network and/or identification of one or more vulnerabilities in one or more network entities and/or one or more services based on the sniffed network traffic.

Another embodiment is directed to a non-transitory computer-readable medium storing computer-executable instructions for a system configured to passively scan a network. The computer-executable instructions may comprise one or more instructions causing an endpoint device to obtain information that is detected based on network traffic traveling to and/or from an endpoint device that is sniffed by an endpoint passive scanner deployed on the network endpoint device. The network traffic may comprise a plurality of packets. The computer-executable instructions may also comprise one or more instructions causing a network entity to discover one or more assets of the network and/or identifying one or more vulnerabilities in one or more network entities and/or one or more services based on the obtained information.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), transport layer security (TLS)

certificate, etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, industrial control system, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof.

Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

It is indicated above that a network can be passively monitored to discover assets and identify vulnerabilities. Currently, passively monitoring for vulnerabilities can be accomplished by deploying a sensor with input from a switched port analyzer (SPAN) port on a core switch or a router. But as seen in FIG. 1, this approach may miss local traffic that never makes it up to the core switch, may be misconfigured or configured to limit scope, or may miss traffic from remote assets.

To address some or all disadvantages of conventional passive network monitoring techniques, it is proposed to distribute the network sniffing capabilities across network endpoints. The passive network monitoring and vulnerability processing may be combined with an endpoint agent (e.g., in software) to provide a more comprehensive view of assets and asset information. This can then be analyzed via an upstream product.

The proposed technique may generally be described as coupling passive asset discovery and vulnerability analysis with endpoint agent vulnerability scanning. This can provide improvements over both passive asset discovery and vulnerability detection and over endpoint vulnerability detection products. It can also provide improvements to the collection of network traffic by covering potentially missed networks, the ability to better correlate network data to location, improved vulnerability analysis for the endpoint product, among others.

In one implementation, a passive vulnerability scanner may be built as a static or dynamic library that can be linked to an endpoint agent. The endpoint agent may be modified to call the passive scanner library functionality, e.g., at startup, and report the passive asset discovery and vulnerability results along with its normal endpoint agent scan results. This can be configured in a number of ways.

Figure 2A:
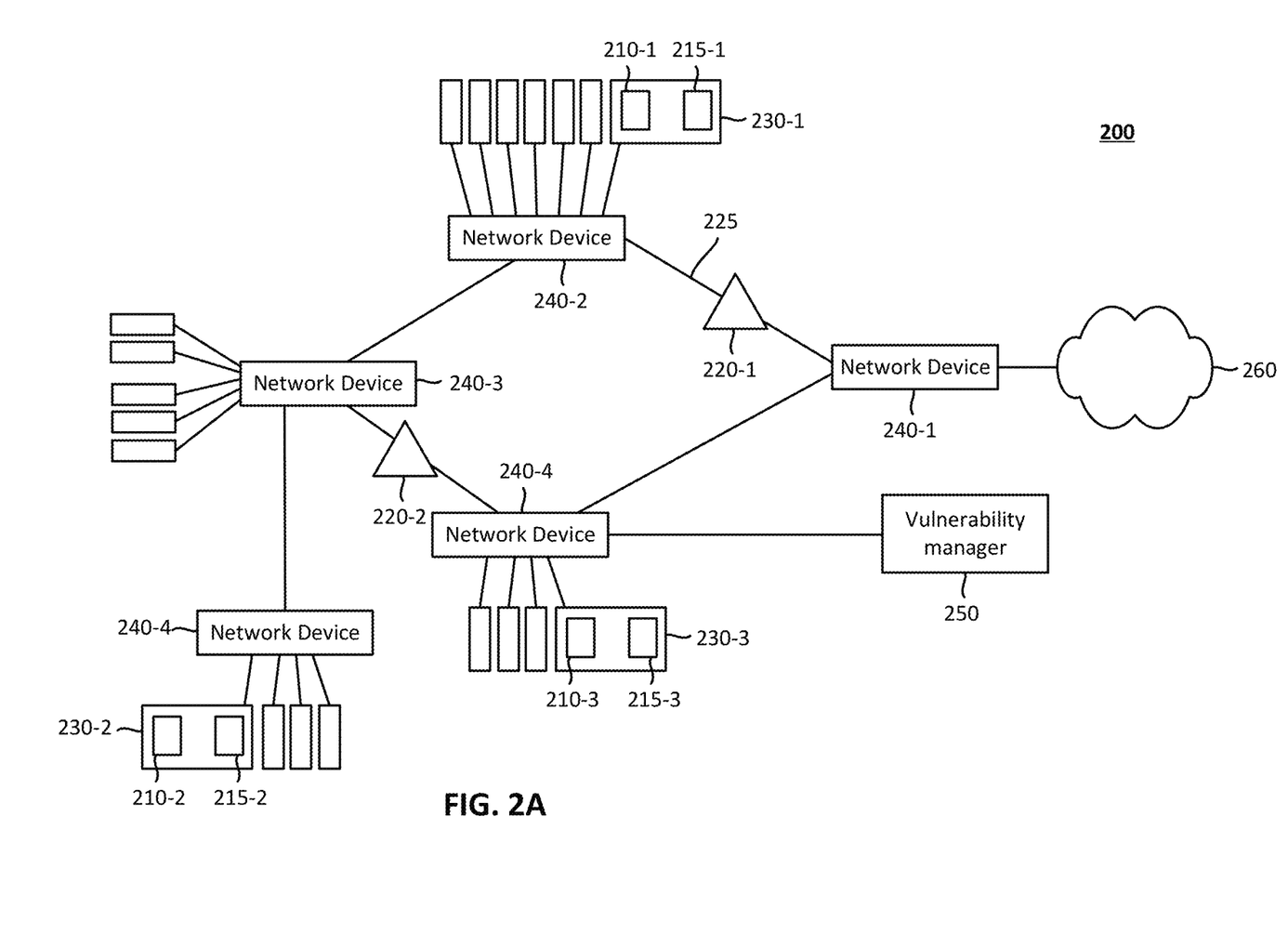
FIGS. 2A and 2B illustrate exemplary networks having various assets for passively monitoring network traffic, according to various aspects of the disclosure.

FIG. 2A illustrates an example of a system or network 200 for passive scanning according to one or more aspects. The network 200 may include one or more passive scanners 220-1, 220-2, etc. (collectively or individually 220), one or more endpoint devices 230-1, 230-2, etc. (collectively or individually 230), and one or more network devices 240-1, 240-2, etc. (collectively or individually 240). In various embodiments, one or more network devices 240 may include wired and/or wireless access points, small cell base stations, network routers, hubs, spanned switch ports, network taps, choke points, and so on.

Passive scanners 220 may sniff network traffic such as packet stream 225 traveling across the network 200. The network traffic may comprise a plurality of network packets. In addition, the network 200 may also include passive scanners deployed at one or more endpoint devices 230. For example, one or more passive scanners 210-1, 210-2, etc. may be deployed in one or more endpoint devices 230. So as to distinguish from passive scanners 220 deployed more inside the network 200, the passive scanners 210 deployed at end point devices 230 may be referred to as endpoint passive scanners 210.

An endpoint passive scanner 210 may be configured to passively monitor network traffic such as network traffic traveling to and/or from corresponding endpoint device 230. For example, endpoint passive scanner 210-1 may sniff network traffic traveling to and/or from network device 230-1. That is, in various embodiments, the endpoint passive scanners 210 may sniff one or more packets or other messages in the traffic traveling across, originating from, or directed to the network 200 (in particular originating from or directed to corresponding endpoint devices 230) to identify endpoint devices 230, network devices 240, other assets in addition to open ports, client/server applications, any vulnerabilities, or other activity associated therewith. In addition, the endpoint passive scanners 210 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, secure socket layer (SSL)/TLS, or other suitable activity that occurs in the network 200. In one implementation, the information that the endpoint passive scanners 210 may obtain from sniffing the network and therefore provide a real-time record describing the activity that occurs in the network 200. Accordingly, in one implementation, the endpoint passive scanners 210 may behave like a security motion detector on the network 200, mapping and monitoring any vulnerabilities, assets, services, applications, sensitive data, and other information that newly appear or change in the network 200. In general, by sniffing, endpoint passive scanner 210 may detect or otherwise obtain information that facilitates discovery of one or more assets of the network 200 and/or identification of one or more vulnerabilities in one or more network entities and/or one or more services active on the one or more network entities.

An endpoint passive scanner 210 may be configured to discover one or more assets of the network 200 and/or identify one or more vulnerabilities based on the detected information. Assets may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 200, cloud instances hosted in off-site server environments, etc.). Those skilled in the art will appreciate that the assets listed above are intended to be exemplary only and that the assets associated with the network 200 may include any suitable combination of the above-listed asset types and/or other suitable asset types.

In one implementation, assets of the network 200 may include one or more network entities (e.g., endpoint devices, hosts, servers, network devices, etc.), one or more applications and/or services running on the one or more network entities, operating systems running on the one or more network entities, etc. Vulnerabilities may include one or more vulnerabilities associated with the one or more applications running on one or more network entities and/or one or more vulnerabilities associated with one or more services running on the one or more network entities.

It should be noted that discovery of assets and/or vulnerabilities may also include discovery of attributes of the assets and/or vulnerabilities. For example, attributes of a network entity asset may include its hardware configuration (e.g., number and/or types of processors, memory capacity, etc.), operating system, and so on. As another example, attributes of an application asset may include its version number, installation/activation date, license limitations, and so on. As a further example, attributes of a vulnerability may include its name, category (e.g., virus, worm, spyware, trojan, etc.), and so on.

An endpoint scanner 210 may be configured to provide a report of the discovered assets and/or the identified vulnerabilities to a vulnerability manager (VM) 250, which may be external to corresponding endpoint device 230. For ease of reference, such report may be referred to as "asset-vulnerability report". For example, endpoint passive scanner 210-1 may provide its asset-vulnerability report to the VM 250.

The VM 250 may use the information provided by the endpoint passive scanners 210 to remediate and otherwise manage the network 200. The VM 250 may also use data provided from passive scanners 220. For example, the VM 250 may build a topology of the network—i.e., network topology—based on asset-vulnerability reports from one or more endpoint passive scanners 210. The network topology may include assets of the network 210 and connections among the network assets. It should be noted that the passive scanners 220 may also provide their own reports to the VM 250, and the VM 250 may take into account these reports in building the network topology. When building the network topology, the VM 250 may "de-duplicate" information. For example, it may be that applications/services running on endpoint device 230-1 are communicating with applications/services running on endpoint device 230-2. In this instance, the VM 250 may recognize that at least some information included in one asset-vulnerability report (e.g., provided from endpoint passive scanner 210-1) and at least some information included in another asset-vulnerability report (e.g., provided from endpoint passive scanner 210-2) may be describing the same communication. Thus, the VM 250 may treat them accordingly.

It should be noted that the endpoint passive scanner 210 may also be configured to build the network topology based on the assets it discovers and/or vulnerabilities it identifies. However, it is more likely that the network topology built by the VM 250 will be more complete than the network topology built by individual endpoint passive scanners 210.

As indicated above, the endpoint passive scanner 210 may be configured to detect or otherwise obtain information that facilitates discovery of assets and/or identification of vulnerabilities. But instead of or in addition to discovering the assets and/or identifying the vulnerabilities based on the detected information, the endpoint passive scanner 210 may be configured to provide a report of the detected information, also referred to as "detection report", to the VM 250. The VM 250 in turn may be configured to discover the assets and/or identify the vulnerabilities based on the detection reports from one or more endpoint passive scanners 210. This means that the VM 250 may also build the network topology based on the detection reports. The VM 250 may also consider information provided from the passive scanners 220 when discovering the assets, identifying the vulnerabilities, and/or building the network topology.

In one implementation, an endpoint passive scanner 210 may be deployed as a passive scan library that can be linked, statically and/or dynamically, to an endpoint agent 215 running on corresponding endpoint device 230. An endpoint passive scanner 210 may run when called by corresponding endpoint agent 215. An endpoint agent 215 may be configured to call corresponding endpoint passive scanner 210 upon startup of corresponding endpoint device 230. For example, when endpoint device 230-1 starts up, endpoint agent 215-1 may call endpoint scanner 210-1, which may be deployed as a library linked to endpoint agent 215-1.

Note that one or more endpoint agents 215 may be configured to perform a local scan for vulnerabilities. That is, an endpoint agent 215 running on an endpoint device 230 may perform a vulnerability scan of the endpoint device 230. In an implementation, the vulnerability scan performed by the endpoint agent 215 need not be limited to scanning active applications and/or services, i.e., need not be limited to applications/services currently running on the endpoint device 230. The vulnerability scan may also include scan of files accessible by the endpoint device 230 including applications/services that are currently inactive (i.e., not currently running) on the endpoint device 230.

In one implementation, when an endpoint passive scanner 210 discovers the one or more assets and/or identifies the one or more vulnerabilities based on the detected/obtained information and a corresponding endpoint agent 215 performs the vulnerability scan on a corresponding endpoint device 230, the vulnerability scan may be correlated with the discovered assets and/or the identified vulnerabilities. The correlation may be performed by the endpoint passive scanner 210 and/or the endpoint agent 215. A correlation report, which is a report of a result of correlating the discovered assets and/or the identified vulnerabilities with the vulnerability scan, may be provided to the VM 250, again by the endpoint passive scanner 210 and/or the endpoint agent 215.

The following are some (not necessarily exhaustive) examples of correlating vulnerability scan data gathered by endpoint agent 215 with passive scan data gathered by endpoint passive scanner 210:

Validating that a patched version of software is actually in use: For example, Google Chrome may be patched to the latest version but not restarted on an endpoint device 230. Endpoint agent scan may not report vulnerabilities because its queries return the newer version. However, passive scan data shows that the older version is still in use.

Linking process activity to network traffic: Endpoint agent scan may show that no 'server' software is installed on the endpoint. A passive scan may see that to be incorrect. This can be used to identify malware or asset inventory or unauthorized installed software.

Identifying credential misuse: Endpoint agent scanner may know existing users that log on to a certain endpoint. Passive scanner may detect different sets of user credentials being transferred. This may indicate issues such as sharing user credentials or malicious activity.

Alternatively, instead of providing the correlation report, the endpoint agent 215 may provide a vulnerability scan report to the VM 250. The vulnerability scan report may comprise a result of performing the vulnerability scan. The VM 250 may be configured to correlate the discovered assets and/or the identified vulnerabilities (e.g., provided in the asset-vulnerability report) with the vulnerability scan (e.g., provided in the vulnerability scan report).

In another alternative, the endpoint agent 215 may provide the vulnerability scan report to the VM 250 when the endpoint passive scanner 210 provides the detection report. In this instance, the VM 250 may be configured to discover the assets and/or identify the vulnerabilities based on the detection report (as indicated above). In addition, the VM 250 may be configured to correlate the discovered assets and/or the identified vulnerabilities with vulnerability scan (e.g., provided in the vulnerability scan report).

In one implementation, the various assets and vulnerabilities in the network 200 may be managed using the VM 250, which may provide a unified security monitoring solution to manage the vulnerabilities and the various assets that make up the network 200. In particular, the VM 250 may aggregate the information obtained from the scanners including endpoint passive scanners 210 and passive scanners 220 to build or update the model or topology associated with the network 200, which may generally include real-time information describing various vulnerabilities, applied or missing patches, intrusion events, anomalies, event logs, file integrity audits, configuration audits, or any other information that may be relevant to managing the vulnerabilities and assets in the network 200. As such, the VM 250 may provide a unified interface to mitigate and manage governance, risk, and compliance in the network 200.

It is important to recognize that a very significant advantage of deploying the endpoint passive scanners 210 at endpoint devices 230 is that the sniffed network traffic detected by the endpoint passive scanner 210 at the corresponding endpoint devices 230 comprises network traffic that would otherwise be undetectable by a passive scanner, such as passive scanner 220, that is external to the endpoint device 230 and/or to the router intranet.

Figure 2B:
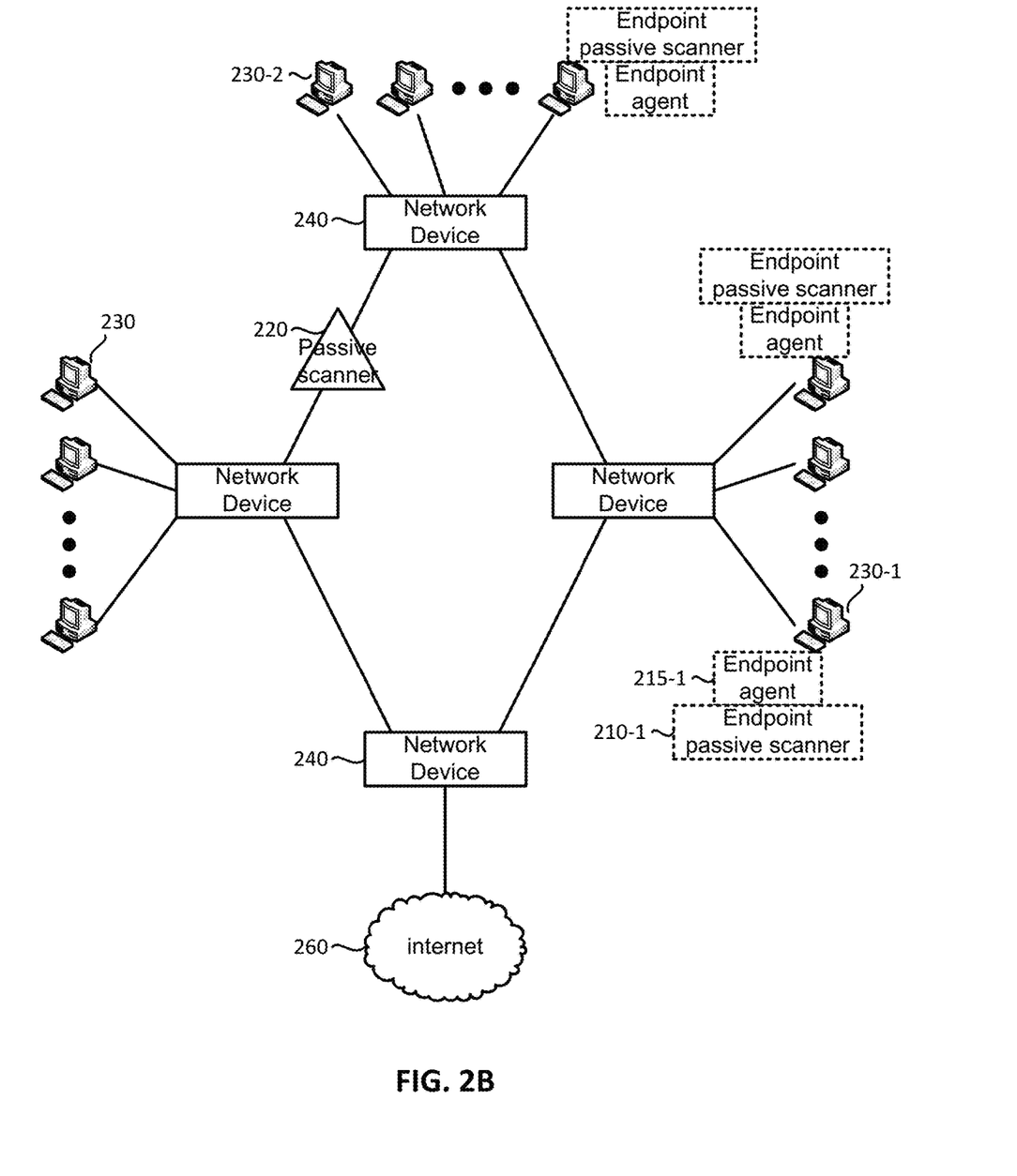

FIG. 2B is provided for demonstration purposes. FIG. 2B may be viewed as a simplified version of the network 200 illustrated in FIG. 2A. So as to minimize clutter, not all elements are numbered. As seen in FIG. 2B, endpoint passive scanners 210 and endpoint agents 215 may be deployed in one or more corresponding endpoint devices 230. Multiple endpoint devices 230 may communicate with each other through multiple network devices 240 (e.g., routers, switches, etc.). For example, endpoint devices 230-1, 230-2 may communicate with each other. However, it is very unlikely that the network traffic between endpoint devices 230-1, 230-2 will flow in the path of the passive scanner 220 to be sniffed.

Fortunately, the endpoint passive scanner 210-1 can sniff the network traffic traveling to and/or from the corresponding endpoint device 230-1, which includes the network traffic between the endpoint devices 230-1, 230-2. Thus, by deploying endpoint passive scanners 210 on endpoint devices 230, network visibility can be enhanced.

Figure 3:
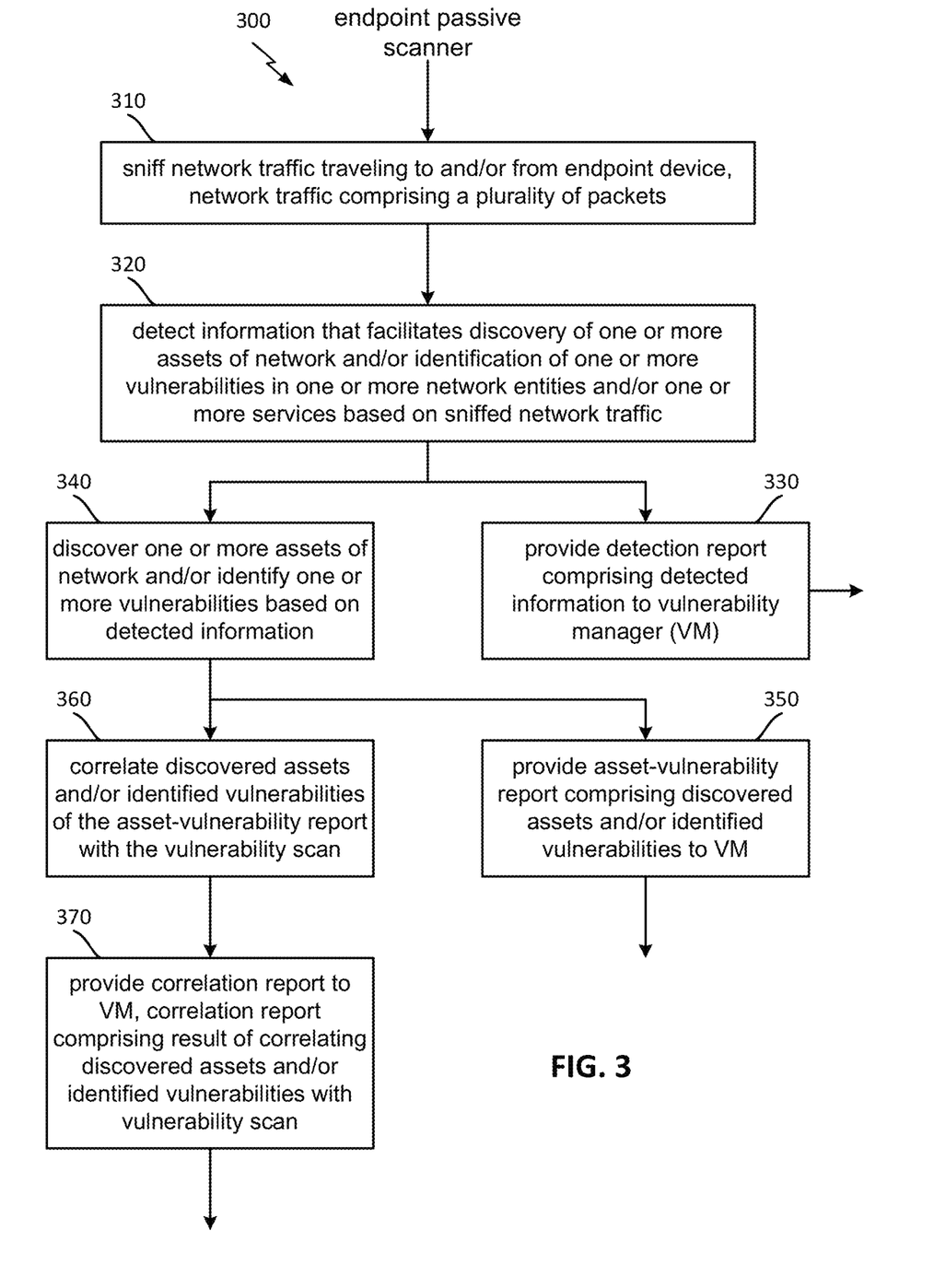
FIGS. 3, 4, 5 and 6 illustrate exemplary processes for passively monitoring for passively monitoring network traffic, according to various aspects of the disclosure.

FIG. 3 illustrates an exemplary process 300 performed by an endpoint passive scanner 210 to passively monitor network traffic traveling across a network such as network 200. As indicated above, the endpoint passive scanner 210 may be deployed on an endpoint device 230 of the network 200 as a passive scan library linked—dynamically and/or statically—to an endpoint agent 215 running on the same endpoint device 230. The endpoint passive scanner 210 may run when the endpoint agent 215 calls on the passive scan library. For example, the endpoint agent 215 may call on the passive scan library upon startup of the endpoint device 230.

In block 310, the endpoint passive scanner 210 may sniff the network traffic traveling to and/or from the endpoint device 230. The network traffic may comprise a plurality of packets. In block 320, the endpoint passive scanner 210 may detect information that facilitates discovery of one or more assets of the network 200 and/or identification of one or more vulnerabilities in one or more network entities and/or one or more services/applications based on the sniffed network traffic.

From the detected information, assets may be discovered and/or vulnerabilities may be identified. In one implementation, the endpoint passive scanner 210 may provide the detected information to an agent, e.g., an asset/vulnerability agent, deployed on a network entity external to the endpoint device 230. For example, in block 330, the endpoint passive scanner 210 may provide a detection report to a vulnerability manager (VM) 250. The detection report may comprise the detected information. The VM 250 may be configured to receive detection reports from one or more endpoint passive scanners 210, and discover the one or more assets and/or identify the one or more vulnerabilities based on the received detection reports. The VM 250 may also be configured to build a network topology based on the received detection reports.

Alternatively or in addition thereto, in another implementation, the endpoint passive scanner 210 may itself perform the discovery and/or the identification. For example, in block 340, the endpoint passive scanner 210 may discover the one or more assets of the network and/or identify the one or more vulnerabilities based on the detected information. Note that in an implementation, the discovery may also include discovery of attributes of the one or more assets and/or identification may also include identification of attributes of the one or more vulnerabilities.

Recall from above, the endpoint agent 215 may perform a vulnerability scan (seen in FIG. 4), which is a scan of applications, services, files, etc. accessible by the endpoint device 230. A result of the vulnerability scan may be correlated with the discovered assets and/or the identified vulnerabilities.

In one implementation, in block 350, the endpoint passive scanner 210 may provide an asset-vulnerability report to the VM 250. The asset-vulnerability report may comprise the one or more discovered assets and/or the one or more identified vulnerabilities. Note that the endpoint agent 215 may also send a vulnerability scan report, which comprises a result of the vulnerability scan, to the VM (also seen in FIG. 4). The VM 250 may be configured to correlate the one or more discovered assets and/or the one or more identified vulnerabilities of the asset-vulnerability report with the vulnerability scan report.

Alternatively or in addition thereto, in another implementation, the endpoint passive scanner 210 may itself perform the correlation. For example, in block 360, the endpoint passive scanner 210 may correlate the one or more discovered assets and/or the one or more identified vulnerabilities with the vulnerability scan. In block 370, the endpoint passive scanner 210 may provide a correlation report to the VM 250. The correlation report may comprise a result of correlating the one or more discovered assets and/or the one or more identified vulnerabilities with the vulnerability scan.

Figure 4:
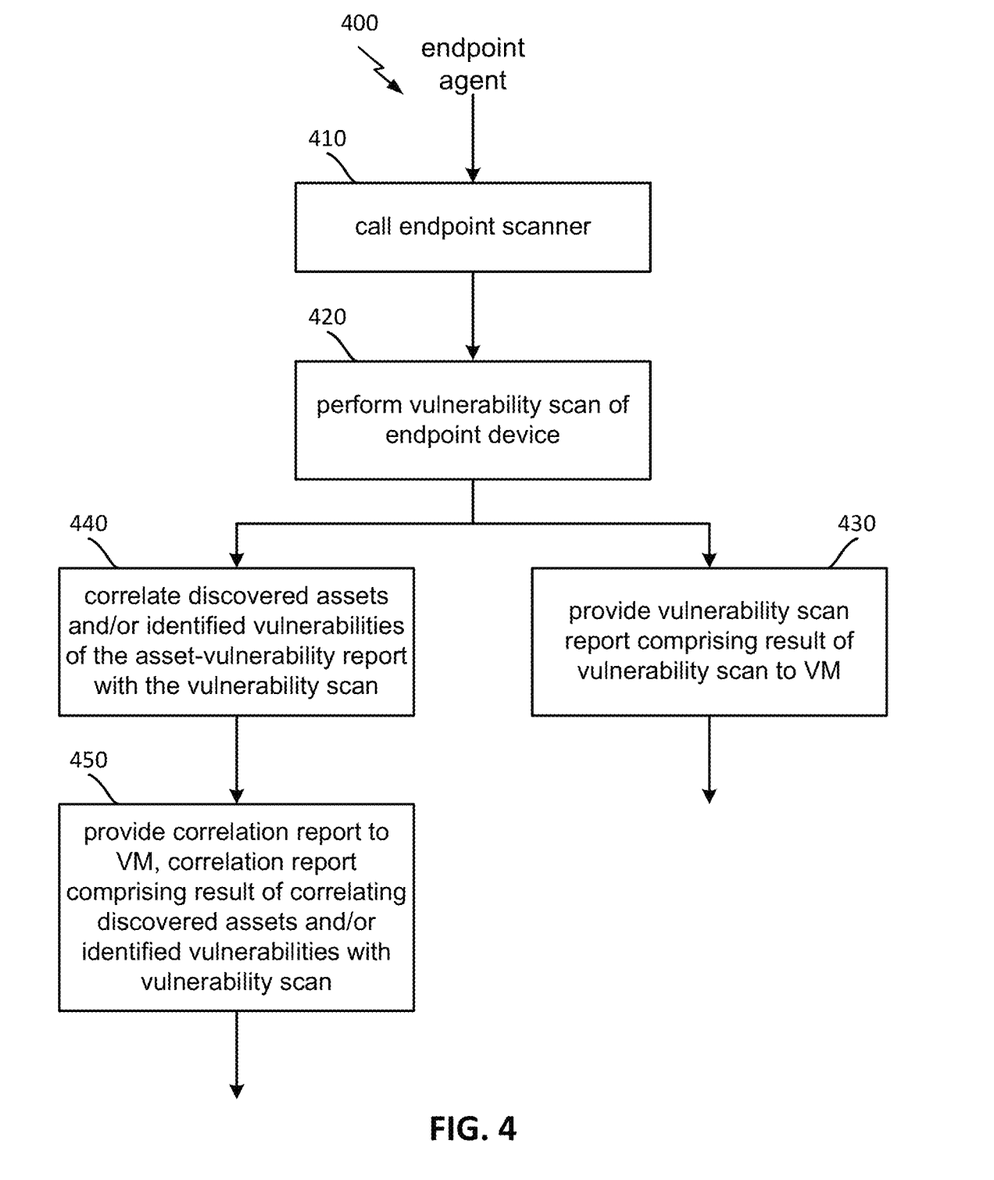

FIG. 4 illustrates an exemplary process 400 performed by an endpoint agent 215 to passively monitor network traffic traveling across a network such as network 200. The endpoint agent 215 may be deployed as an application or service on an endpoint device 230 of the network 200.

In block 410, the endpoint agent 215 may call on an endpoint passive scanner 210. As indicated, the endpoint passive scanner 210 may be deployed on the endpoint device 230 as a passive scan library linked to the endpoint agent 215. In an implementation, the endpoint agent 215 may call on the endpoint passive scanner 210 upon startup of the endpoint device 230.

In block 420, the endpoint agent 215 may perform a vulnerability scan of the endpoint device 230. In block 430, the endpoint agent 215 may provide the vulnerability scan report to the VM 250. As indicated above, when the endpoint passive scanner 210 provides the asset-vulnerability report to the VM 250, the VM 250 may correlate the discovered assets and/or the identified vulnerabilities with the result of the vulnerability scan.

Alternatively or in addition thereto, in block 440, the endpoint agent 215 may correlate the one or more discovered assets and/or the one or more identified vulnerabilities with the vulnerability scan. In block 450, the endpoint agent 215 may provide a correlation report to the VM 250.

It should be noted that correlating (block 360, 440) may be performed by the endpoint passive scanner 210 or the endpoint agent 215. Similarly, providing the correlation report (block 370, 450) may be performed by the endpoint passive scanner 210 or the endpoint agent 215.

Figure 5:
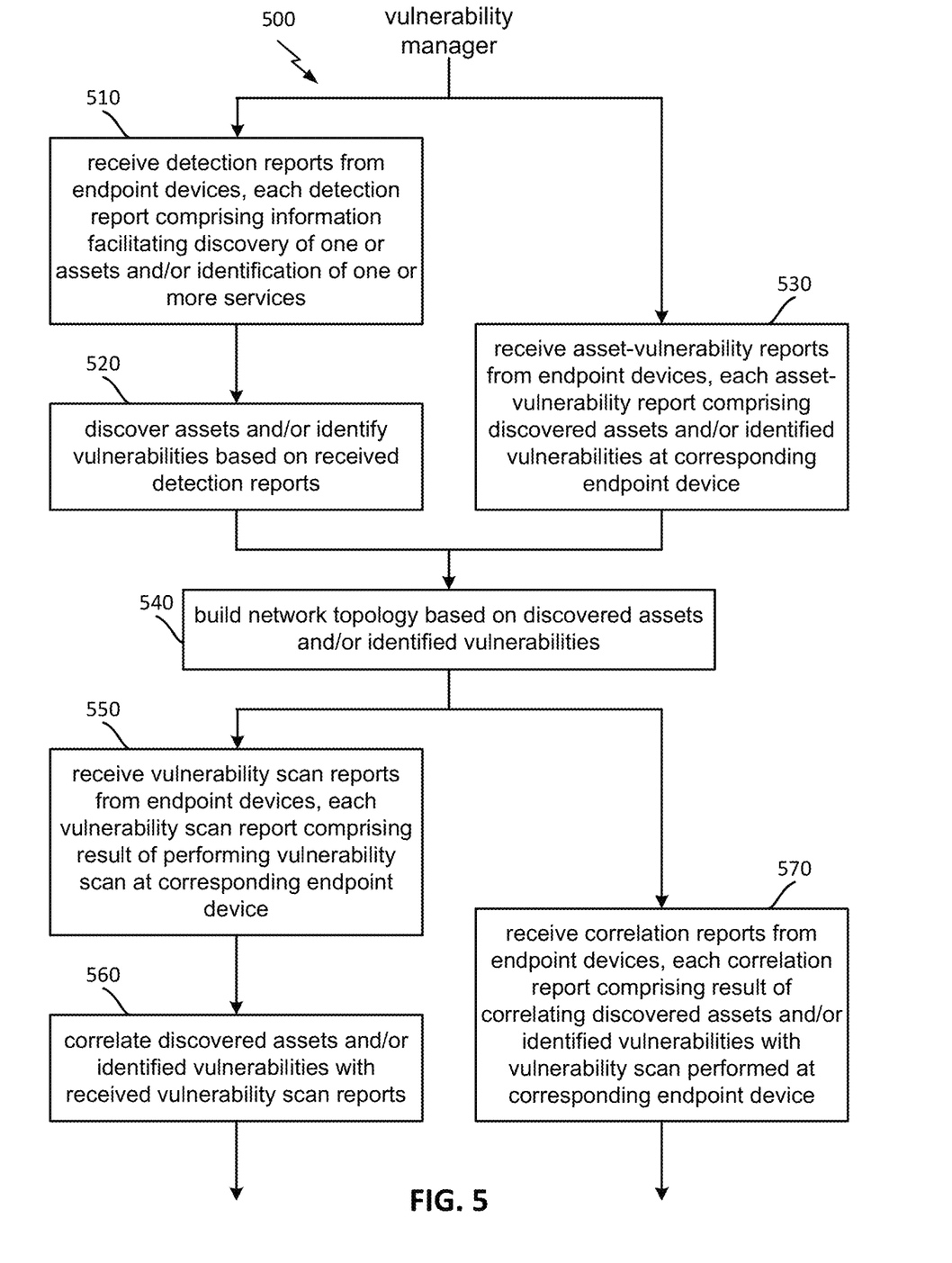

FIG. 5 illustrates an exemplary process 500 performed by a vulnerability manager (VM) 250. In block 510, the VM 250 may receive detection reports from one or more endpoint devices 230 (e.g., one or more endpoint passive scanners 210 deployed on the one or more endpoint devices 230). Each detection report may comprise information that facilitates discovery of one or more assets and/or identification of one or more vulnerabilities of the network. Again, the information may also facilitate discovery of attributes of the one or more assets and/or may facilitate identification of attributes of the one or more vulnerabilities. The information from each endpoint device 230 may have been detected based on sniffing of network traffic traveling to and/or from the endpoint 230. In block 520, the VM may discover the one or more assets and/or identify the one or more vulnerabilities based on the detection reports.

Alternatively or in addition thereto, in block 530, the VM 250 may receive asset-vulnerability reports from one or more endpoint devices 230 (e.g., one or more endpoint passive scanners 210 deployed on the one or more endpoint devices 230). Each asset-vulnerability report may comprise discovered assets and/or identified vulnerabilities at corresponding endpoint device.

In block 540, the VM 250 may build network topology based on the discovered assets and/or the identified vulnerabilities. In block 550, the VM 250 may receive vulnerability scan reports from one or more endpoint devices 230 (e.g., from one or more endpoint scanners 210 and/or one or more endpoint agents 215). Each vulnerability scan report may comprise a result of performing a vulnerability scan at the corresponding endpoint device 230. In block 560, the VM 250 may correlate the discovered assets and/or the identified vulnerabilities with the received vulnerability scan reports.

Alternatively or in addition thereto, in block 570, the VM 250 may receive correlation reports from one or more endpoint devices 230 (e.g., from one or more endpoint scanners 210 and/or one or more endpoint agents 215). Each correlation report may comprise a result of correlating discovered assets and/or identified vulnerabilities with vulnerability scan performed at corresponding endpoint device 230.

Figure 6:
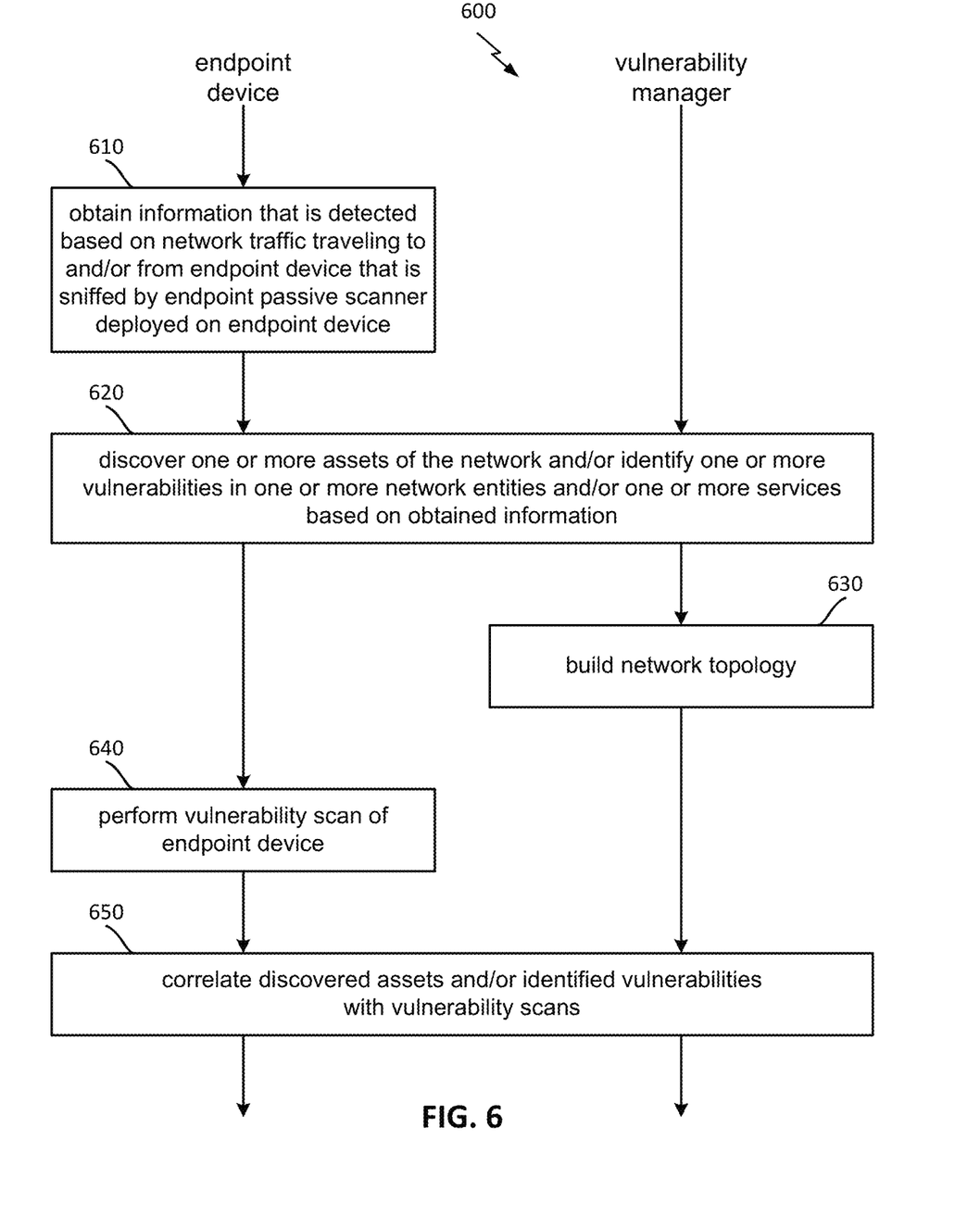

FIG. 6 illustrates an exemplary process 600 to passively monitor network traffic traveling across a network such as network 200. FIGS. 3-5 may be viewed as illustrating exemplary process from the perspective of individual agents—the endpoint passive scanner 210 (FIG. 3), the endpoint agent 215 (FIG. 4), and the vulnerability manager 250 (FIG. 5). On the other hand, FIG. 6 may be viewed as providing a more system-wide perspective.

In block 610, at an endpoint device 230, information may be obtained that is detected based on network traffic traveling to and/or from the endpoint device 230 that is sniffed by an endpoint passive scanner 210 deployed on the endpoint device 230. Again, the network traffic may comprise a plurality of packets. Block 610 may be performed by the endpoint passive scanner 210.

In block 620, one or more assets of the network may be discovered and/or one or more vulnerabilities in one or more network entities and/or in one or more services based on the obtained information. The services may be any applications and/or services active on any of the network entities (e.g., endpoint devices 230, network devices 240, etc.). Block 620 may be performed by the VM 250. Alternatively or in addition thereto, block 620 may be performed by the endpoint device 230 (e.g., by the endpoint passive scanner 210).

In block 630, network topology may be built based on the discovered assets and/or the identified vulnerabilities. Block 630 may be performed by the VM 250. While not shown, it should be noted that block 630 may also be performed by the endpoint device 230 (e.g., by the endpoint passive scanner 210). However, it is recognized that the network topology built by the endpoint device 230 may be less comprehensive than the network topology built by the VM 250.

In block 640, a vulnerability scan of the endpoint device 230 may be performed. Block 640 may be performed by the endpoint device 230 (e.g., by the endpoint agent 215). In block 650, the discovered assets and/or the identified vulnerabilities may be correlated with the vulnerability scan. Block 650 may be performed by the VM 250. Alternatively or in addition thereto, block 650 may be performed by the endpoint device 230 (e.g., by the endpoint passive scanner 210 and/or the endpoint agent 215).

Figure 7:
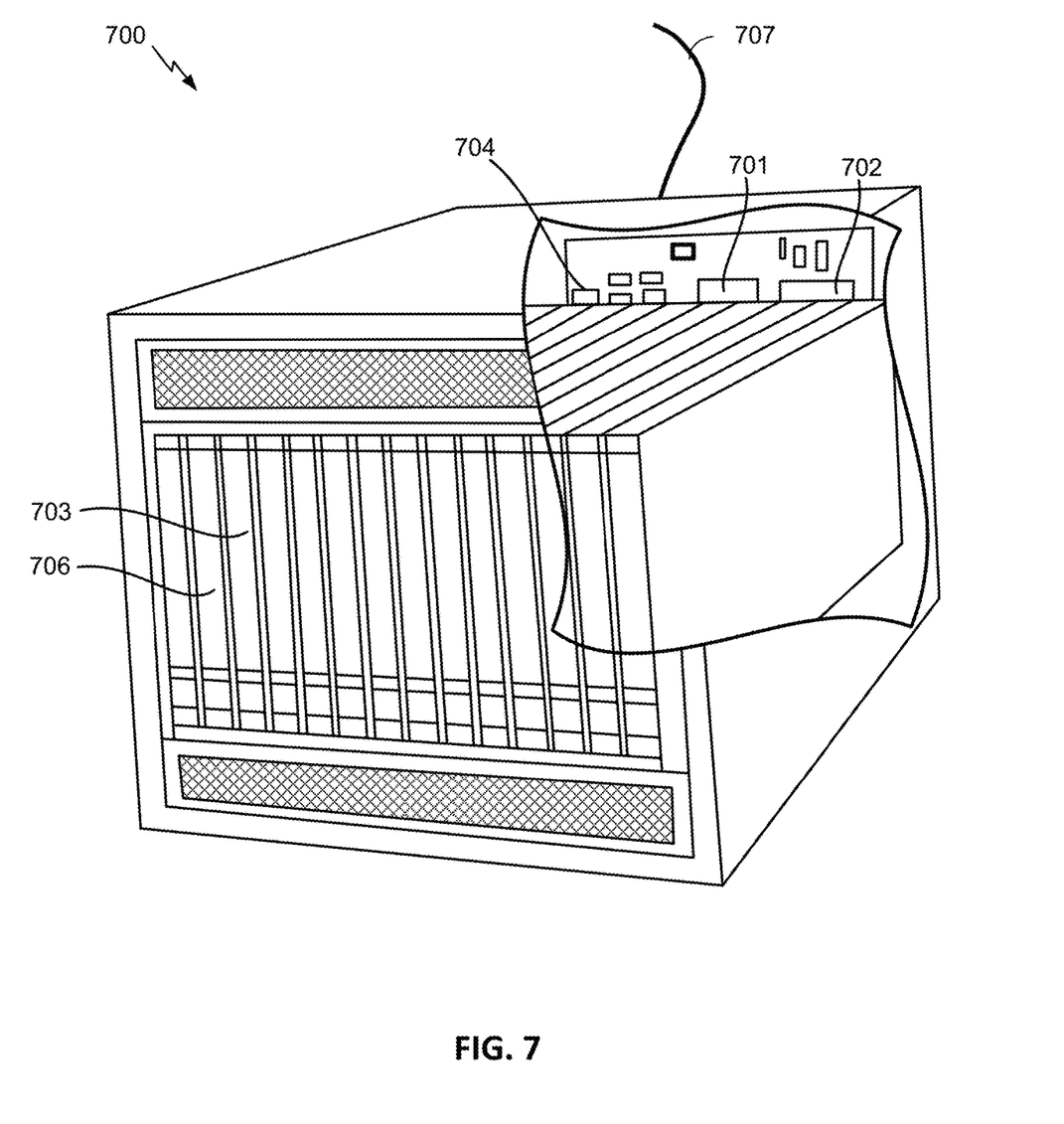
FIG. 7 illustrates an apparatus, according to various aspects of the disclosure.

The various embodiments may be implemented on any of a variety of commercially available computing devices, such as an apparatus 700 illustrated in FIG. 7. In an example, the apparatus 700 may correspond to one example configuration of a computing device on applications that passively monitor network traffic may execute, e.g., as part of an endpoint passive scanner 210 (deployed on an endpoint device 230) configured to perform the processes illustrated in FIGS. 3 and 6. In another example, the apparatus 700 may correspond to one example configuration of a computing device on applications that passively monitor network traffic may execute, e.g., as part of an endpoint agent 215 (on an endpoint device 230) configured to perform the processes illustrated in FIGS. 4 and 6. In a further example, the apparatus 700 may correspond to one example configuration of a computing device on applications that passively monitor network traffic may execute, e.g., as part of a vulnerability manager 250 configured to perform the processes illustrated in FIGS. 5 and 6.

In FIG. 7, the apparatus 700 may include one or more processors 701 coupled to volatile memory 702 and a large capacity nonvolatile memory, such as a disk drive 703. The apparatus 700 may also include a floppy disc drive, flash/solid state media drive, compact disc (CD) or DVD disc drive 706 coupled to the one or more processors 701. The apparatus 700 may also include network access ports 704 coupled to the one or more processors 701 for establishing data connections with a network 707, such as a local area network coupled to other broadcast system computers and servers or to the Internet. The network access ports 704 may be more broadly described as communicators 704.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, flash/solid state media, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for passively scanning a network, the method comprising:
    sniffing, by an endpoint passive scanner deployed on an endpoint device, network traffic traveling to and/or from the endpoint device, the network traffic comprising a plurality of packets;
    detecting, by the endpoint passive scanner, information that facilitates discovery of one or more assets of the network and/or identification of one or more vulnerabilities in one or more network entities and/or one or more services based on the sniffed network traffic; and
    performing, by an endpoint agent running on the endpoint device, a vulnerability scan of the endpoint device,
    wherein the endpoint passive scanner is deployed as a passive scan library linked to the endpoint agent running on the endpoint device, and
    wherein the endpoint passive scanner is configured to run when the endpoint agent calls the passive scan library.

2. The method of claim 1, further comprising:
    discovering, by the endpoint passive scanner, the one or more assets of the network and/or identifying the one or more vulnerabilities based on the detected information.

3. The method of claim 2,
    wherein discovering the one or more assets includes discovering attributes of the one or more assets, and/or
    wherein identifying the one or more vulnerabilities includes identifying attributes of the one or more vulnerabilities.

4. The method of claim 2, further comprising:
    providing, by the endpoint passive scanner, an asset-vulnerability report comprising the one or more discovered assets and/or the one or more identified vulnerabilities to a vulnerability manager (VM),
    wherein the VM is external to the endpoint device.

5. The method of claim 4, wherein the VM is configured to build a network topology of the network based on one or more asset-vulnerability reports from one or more endpoint passive scanners.

6. The method of claim 4, further comprising:
    correlating, by the endpoint agent and/or the endpoint passive scanner, the one or more discovered assets and/or the one or more identified vulnerabilities with the vulnerability scan; and
    providing, by the endpoint agent and/or the endpoint passive scanner, a correlation report to the VM, the correlation report comprising a result of correlating the one or more discovered assets and/or the one or more identified vulnerabilities with the vulnerability scan.

7. The method of claim 4, further comprising:
    providing, by the endpoint agent, a vulnerability scan report to the VM, the vulnerability scan report comprising a result of performing the vulnerability scan.

8. The method of claim 7, wherein the VM is configured to correlate the one or more discovered assets and/or the one or more identified vulnerabilities of the asset-vulnerability report with the vulnerability scan report.

9. The method of claim 1, further comprising:
    providing, by the endpoint passive scanner, a detection report comprising the detected information to a vulnerability manager (VM),
    wherein the VM is external to the endpoint device.

10. The method of claim 9, wherein the VM is configured to discover the one or more assets of the network and/or identify the one or more vulnerabilities in the one or more network entities and/or the one or more services based on one or more detection reports from one or more endpoint passive scanners.

11. The method of claim 9, wherein the VM is configured to build a network topology of the network based on one or more detection reports from one or more endpoint passive scanners.

12. The method of claim 9, further comprising:
    providing, by the endpoint agent, a vulnerability scan report to the VM, the vulnerability scan report being a report of a result of performing the vulnerability scan.

13. The method of claim 12, wherein the VM is configured to correlate the one or more discovered assets and/or the one or more identified vulnerabilities with the vulnerability scan report.

14. The method of claim 1, further comprising:
    calling, by the endpoint agent, the passive scan library upon startup of the endpoint device.

15. The method of claim 1, wherein the one or more assets of the network include any combination of:
    one or more network entities,
    one or more applications and/or services running on the one or more network entities, and
    operating systems running on the one or more network entities.

16. The method of claim 15, wherein the one or more vulnerabilities of the network include one or both of:
    one or more vulnerabilities associated with one or more applications running on one or more network entities, and
    one or more vulnerabilities associated with one or more services running on the one or more network entities.

17. A method for passively scanning a network, the method comprising:
    obtaining information that is detected based on network traffic traveling to and/or from an endpoint device that is sniffed by an endpoint passive scanner deployed on the endpoint device, the network traffic comprising a plurality of packets;
    discovering one or more assets of the network and/or identifying one or more vulnerabilities in one or more network entities and/or one or more services based on the obtained information; and
    performing, by an endpoint agent running on the endpoint device, a vulnerability scan of the endpoint device,
    wherein the endpoint passive scanner is deployed as a passive scan library linked to the endpoint agent running on the endpoint device, and
    wherein the endpoint passive scanner is configured to run when the endpoint agent calls the passive scan library.

18. The method of claim 17,
    wherein discovering the one or more assets includes discovering attributes of the one or more assets, and/or
    wherein identifying the one or more vulnerabilities includes identifying attributes of the one or more vulnerabilities.

19. The method of claim 17,
    wherein obtaining is performed by the endpoint passive scanner, and
    wherein discovering and/or identifying are performed by the endpoint passive scanner.

20. The method of claim 19, further comprising:
    correlating, by the endpoint agent and/or the endpoint passive scanner, the one or more discovered assets and/or the one or more identified vulnerabilities with the vulnerability scan.

21. The method of claim 19, further comprising:

building, by a vulnerability manager (VM), a network topology of the network based on the one or more discovered assets and/or the one or more identified vulnerabilities, wherein the VM is external to the endpoint device.

22. The method of claim 21, further comprising:

correlating, by the VM, the one or more discovered assets and/or the one or more identified vulnerabilities with the vulnerability scan.

23. The method of claim 17, wherein obtaining is performed by the endpoint passive scanner, and wherein discovering and/or identifying are performed by a vulnerability manager (VM) based on the obtained information, the VM being external to the endpoint device.

24. The method of claim 23, further comprising:

building, by a vulnerability manager (VM), a network topology of the network based on the obtained information.

25. The method of claim 23, further comprising:

correlating, by the VM, the one or more discovered assets and/or the one or more identified vulnerabilities with the vulnerability scan.

26. The method of claim 17, wherein the one or more assets of the network include any combination of:

one or more network entities, one or more applications and/or services running on the one or more network entities, and operating systems running on the one or more network entities, and wherein the one or more vulnerabilities include one or both of:

one or more vulnerabilities associated with one or more applications running on one or more network entities, and one or more vulnerabilities associated with one or more services running on the one or more network entities.

27. The method of claim 17, obtaining, from a passive scanner deployed inside the network, other information that is detected based on other network traffic traveling to and/or from a plurality of assets of the network, wherein the endpoint passive scanner is one of the plurality of assets.

28. An endpoint device configured to passively scan a network, comprising:

a memory; and at least one processor coupled to the memory, wherein when an endpoint passive scanner is deployed on the endpoint device, the at least one processor and the memory are configured to:

sniff network traffic traveling to and/or from the endpoint device, the network traffic comprising a plurality of packets; and detect information that facilitates discovery of one or more assets of the network and/or identification of one or more vulnerabilities in one or more network entities and/or one or more services based on the sniffed network traffic, and wherein when an endpoint agent is deployed on the endpoint device, the at least one processor and the memory are configured to:

perform a vulnerability scan of the endpoint device, wherein the endpoint passive scanner is deployed as a passive scan library linked to the endpoint agent running on the endpoint device, and wherein the endpoint passive scanner is configured to run when the endpoint agent calls the passive scan library.

* * * * *